US012542486B2

(12) United States Patent
Wang

(10) Patent No.: US 12,542,486 B2
(45) Date of Patent: Feb. 3, 2026

(54) SWITCHING POWER SUPPLY, AND CONTROL CIRCUIT AND CONTROL METHOD THEREOF

(71) Applicant: Joulwatt Technology Co., Ltd., Hangzhou (CN)

(72) Inventor: Siyun Wang, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 339 days.

(21) Appl. No.: 18/129,339

(22) Filed: Mar. 31, 2023

(65) Prior Publication Data

US 2023/0327552 A1   Oct. 12, 2023

(30) Foreign Application Priority Data

Mar. 31, 2022  (CN) .......................... 202210343235.5

(51) Int. Cl.
*H02M 3/158* (2006.01)
*H02M 1/00* (2006.01)

(52) U.S. Cl.
CPC ......... *H02M 3/158* (2013.01); *H02M 1/0025* (2021.05)

(58) Field of Classification Search
CPC .................................................. H02M 1/0043
See application file for complete search history.

(56) References Cited

U.S. PATENT DOCUMENTS

2020/0105185 A1* 4/2020 Chen ......................... F21S 4/20
2021/0028705 A1* 1/2021 Ishikura .............. H02M 3/1584

FOREIGN PATENT DOCUMENTS

| CN | 102403907 A | 4/2012 |
|----|-------------|--------|
| CN | 107546977 A | 1/2018 |
| CN | 108306497 A | 7/2018 |

OTHER PUBLICATIONS

Mishra et al: "Design Considerations for a Low-Voltage High-Current Redundant Parallel Voltage Regulator Module System", IEEE Transactions on Industrial Electronics, vol. 58, No. 4, Apr. 2011, Piscataway, NJ, USA, (Year: 2011).*

"Design Considerations for a Low-Voltage High-Current Redundant Parallel Voltage Regulator Module System". Santanu Mishra, and Xingsheng Zhou. IEEE Transactions on Industrial Electronics, vol. 58, No. 4, Apr. 2011.

* cited by examiner

*Primary Examiner* — Gary L Laxton
*Assistant Examiner* — Jennifer C Caulk
(74) *Attorney, Agent, or Firm* — Treasure IP Group, LLC

(57) ABSTRACT

The present disclosure relates to a switching power supply, and a control circuit and a control method of the switching power supply. The switching power supply comprises N-phase power conversion circuits, N being an integer greater than or equal to 1. The control circuit comprises a current reference signal generating means and a control means. The current reference signal generating means is configured to obtain an integration signal by integrating an error between a first compensation signal and a first voltage signal, and obtains a current reference signal by adding the integration signal and the first compensation signal. The control means provides control signals for respective ones of the N-phase power conversion circuits in accordance with the current reference signal. The first compensation signal represents a difference information between an output feedback signal of the switching power supply and a predetermined reference voltage.

16 Claims, 8 Drawing Sheets

SWITCHING POWER SUPPLY, AND CONTROL CIRCUIT AND CONTROL METHOD THEREOF

CROSS REFERENCE TO RELATIONED APPLICATIONS

The present application claims the priority of Chinese Patent Application No. CN202210343235.5, filed on Mar. 31, 2022 and entitled "SWITCHING POWER SUPPLY, AND CONTROL CIRCUIT AND CONTROL METHOD THEREOF", the entire contents of which are incorporated herein by reference.

FIELD OF TECHNOLOGY

The present disclosure relates to the technical field of power converters, and in particular, to a switching power supply, and a control circuit and a control method of the switching power supply.

BACKGROUND

Today's electronic components, such as central processors and memory, have a gradually decreasing driving voltage, resulting in a reduced tolerance range for voltage ripple. However, the power consumption of electronic components has not decreased to the same extent, causing the required operating current to increase, and larger currents can lead to larger voltage ripples. To address these issues, multi-phase conversion circuit architecture has been developed, making the current dispersedly to be provided by multiple conversion circuits. Compared to the single-phase conversion circuit architecture, the multi-phase conversion circuit architecture not only performs well in eliminating voltage ripple but also has excellent advantages in dynamic response, output ripple current elimination, and heat dissipation.

Traditional high dynamic response switch-mode converters typically use a multi-channel interleaved parallel structure with a dual-loop control method, including a current loop and a voltage loop, to increase a dynamic response speed, maintain voltage control accuracy, and reduce voltage-current ripple. Voltage-mode control is the most commonly used control method in the voltage-type output power converters, which can eliminate a static error of output voltage and maintain a high precision. However, it cannot respond immediately when a load is disturbed, and is not ideal for a dynamic response speed. Current-mode control includes average current control, peak current control, and valley current control, in which the peak current mode control is most-widely used. The peak current mode control is a control method in which switching devices are turned on at a fixed clock and turned off at a peak current. This control method can increase a response speed of the converter when an input voltage and a load current are changed, moreover, an over-current protection can be easily involved for the converter.

The conventional fast over-current protection of a switching power supply is achieved by limiting a peak value or a valley value of an inductance current. However, due to relatively large variations of inductance values among a plurality of phases of the switching power supply, it is difficult to achieve a high current accuracy of the switching power supply, and the fast current limiting effect of the conventional switching power supplies is relatively poor.

Therefore, it is necessary to provide an improved technical solution to overcome the above technical problems in the prior art.

SUMMARY

In order to solve the above technical problems, the present disclosure provides a switching power supply, and a control circuit and a control method of the switching power supply, which can realize a fast current limiting protection of the switching power supply and improve an accuracy of an output current of the switching power supply.

According to a first aspect of the present disclosure, there is provided a control circuit of a switching power supply which includes N-phase power conversion circuits, N being an integer greater than or equal to 1, wherein the control circuit comprises:
  a current reference signal generating means configured to obtain an integration signal by integrating an error between a first compensation signal and a first voltage signal, and to obtain a current reference signal by adding the integration signal and the first compensation signal;
  a control means, configured to obtain a control signal corresponding to each phase power conversion circuits in accordance with the current reference signal, for controlling the each phase power conversion circuit to supply power to a load,
  wherein the first compensation signal represents a difference information between an output feedback signal of the switching power supply and a predetermined reference voltage, and the first voltage signal represents an average current information of the each phase power conversion circuit of the N-phase power conversion circuits.

Optionally, the current reference signal generating means comprises:
  an error integration circuit, configured to integrate a difference between the first compensation signal and the first voltage signal and to output the integration signal;
  a first adder, configured to add the first compensation signal and the integration signal to generate the current reference signal.

Optionally, N is equal to 1, and the first voltage signal represents an average value of an output current of a power conversion circuit.

Optionally, the first voltage signal is obtained by sampling an output current of the switching power supply, or by sampling an output current of the power conversion circuit and taking an average value.

Optionally, the control means is configured to generate a peak current reference signal and/or a valley current reference signal in accordance with the current reference signal, and the control signal is obtained in accordance with the peak current reference signal and/or the valley current reference signal, and with an inductance current sampling signal of the power conversion circuit, for triggering the turning on or off control of the switching devices in the power conversion circuit.

Optionally, N is greater than 1, and the first voltage signal represents an average current value of the each phase power conversion circuit of the N-phase power conversion circuits.

Optionally, the first voltage signal is obtained by sampling an output current of the switching power supply and dividing the output current by N; or obtained by sampling a total output current of the N-phase power conversion circuits which are connected in parallel, averaging the total output current, and dividing t by N; or by sampling output currents of the each phase power conversion circuit of the N-phase power conversion circuits, summing, averaging a sum of the output currents, and dividing by N.

Optionally, the control means comprises:

N-phase control units, corresponds to N-phase power conversion circuits one by one, each phase control unit of the N-phase control units is configured to generate a peak current reference signal and/or a valley current reference signal for the corresponding phase power conversion circuit in accordance with the current reference signal, and to obtain a control signal in accordance with the peak current reference signal and/or the valley current reference signal of the corresponding phase power conversion circuit, and with an inductance current sampling signal of the corresponding phase power conversion circuit, for triggering the turning on or off control of the switching devices in the corresponding phase power conversion circuit.

Optionally, the control means comprises:

a current reference signal processing means, configured to generate a peak current reference signal and/or a valley current reference signal in accordance with the current reference signal;

N-phase control units, corresponds to N-phase power conversion circuits one by one, each phase control unit of the N-phase control units is configured to obtain a control signal in accordance with the peak current reference signal and/or the valley current reference signal, and with an inductance current sampling signal of the corresponding phase power conversion circuit, for triggering the turning on or off control of the switching devices in the corresponding phase power conversion circuit.

Optionally, N is greater than 1, and the current reference signal generating means comprises:

N-phase first voltage signal generating units, corresponds to N-phase power conversion circuits one by one, each phase first voltage signal generating unit of the N-phase first voltage signal generating units is configured to generate a first voltage signal for the corresponding phase power conversion circuit;

N-phase current reference signal generating units, corresponds to N-phase power conversion circuits one by one, each phase current reference signal generating unit of the N-phase current reference signal generating units is configured to obtain an integration signal of the corresponding phase power conversion circuit by integrating an error between the first voltage signal of the corresponding phase power conversion circuit and the first compensation signal, and to obtain a current reference signal of the corresponding phase power conversion circuit by adding the integration signal of the corresponding phase power conversion circuit and the first compensation signal;

the control means comprises N-phase control units, corresponds to N-phase power conversion circuits one by one, each phase control unit of the N-phase control units is configured to obtain a control signal of the corresponding phase power conversion circuit in accordance with a current reference signal of the corresponding phase power conversion circuit to control the phase power conversion circuit to supply power to a load, wherein the first voltage signal of each phase power conversion circuit represents an average value of the output current of the corresponding phase power conversion circuit.

Optionally, each phase current reference signal generating unit of the N-phase current reference signal generating units comprises:

an error integration circuit, configured to integrate a difference between the first compensation signal and the first voltage signal of the corresponding phase power conversion circuit, and to output an integration signal of the corresponding phase power conversion circuit;

a first adder, configured to add the integration signal of the corresponding phase power conversion circuit and the first compensation signal to generate a current reference signal of the corresponding phase power conversion circuit.

According to a second aspect of the present disclosure, there is provided another control circuit of a switching power supply which includes N-phase power conversion circuits, N being an integer greater than or equal to 1, wherein the control circuit comprises:

a current reference signal generating means, configured to obtain an integration signal by integrating an error between a first compensation signal and a first voltage signal, and to obtain a current reference signal in accordance with the integration signal when the first compensation signal does not reach a predetermined current limiting threshold, and to obtain a current reference signal in accordance with the first compensation signal when the first compensation signal reaches the predetermined current limiting threshold;

a control means, configured to obtain a control signal corresponding to each phase power conversion circuit in accordance with the current reference signal, for controlling each phase power conversion circuits to supply power to a load, wherein the first compensation signal represents a difference information between an output feedback signal of the switching power supply and a predetermined reference voltage, and the first voltage signal represents an average current information of the power conversion circuit.

Optionally, when the first compensation signal reaches the predetermined current limiting threshold, the current reference signal generating means is configured to provide the first compensation signal as the current reference signal, or to provide a sum of the integration signal and the first compensation signal as the current reference signal.

According to a third aspect of the present disclosure, there is provided a switching power supply, wherein the switching power supply comprises: N-phase power conversion circuits which are connected in parallel, and a control circuit as mentioned above.

According to a fourth aspect of the present disclosure, there is provided a control method of a switching power supply which includes N-phase power conversion circuits, N being an integer greater than or equal to 1, wherein the control method comprises:

obtaining a first compensation signal and a first voltage signal;

obtaining an integration signal by integrating an error between the first compensation signal and the first voltage signal;

obtaining a current reference signal by adding the integration signal and the first compensation signal;

obtaining control signal for corresponding to each phase power conversion circuit in accordance with the current reference signal for controlling each phase power conversion circuits to supply power to a load, wherein the first compensation signal represents a difference information between an output feedback signal of the switching power supply and a predetermined reference voltage, and the first voltage signal represents an average current information of the each phase power conversion circuit of the N-phase power conversion circuits.

Optionally, the method of obtaining the first compensation signal comprises:

obtaining a second sampling signal by sampling an output voltage of the switching power supply;

obtaining an amplified error signal by amplifying an error between the second sampling signal and the predetermined reference voltage signal;

obtaining the first compensation signal by compensating the amplified error signal.

Optionally, N is equal to 1, and the method of obtaining the first voltage signal comprises:

obtaining the first voltage signal by sampling an output current of the switching power supply; or obtaining the first voltage signal by sampling an output current of a power conversion circuit, and taking an average value.

Optionally, N is greater than 1, and the method of obtaining the first voltage signal comprises:

obtaining the first voltage signal by sampling an output current of the switching power supply and dividing the output current by N; or obtaining the first voltage signal by sampling a total output current of the N-phase power conversion circuits which are connected in parallel, averaging the total output current, and dividing by N; or obtaining the first voltage signal by sampling output currents of each phase power conversion circuit of the N-phase power conversion circuits, summing the output currents, averaging a sum of the output currents, and dividing by N.

Optionally, N is greater than 1, and the method of obtaining the first voltage signal comprises:

obtaining sampling signals corresponding to each phase power conversion circuit by sampling output currents of each phase power conversion circuit;

obtaining first voltage signals corresponding to each phase power conversion circuit by averaging the sampling signals of each phase power conversion circuit.

According to a fifth aspect of the present disclosure, there is provided another control method of a switching power supply which includes N-phase power conversion circuits, N being an integer greater than or equal to 1, wherein the control method comprises:

obtaining a first compensation signal and a first voltage signal;

obtaining an integration signal by integrating an error between the first compensation signal and the first voltage signal;

determining whether the first compensation signal reaches a predetermined current limiting threshold, and obtaining a current reference signal in accordance with the integration signal when the first compensation signal does not reach the predetermined current limiting threshold, and obtaining a current reference signal in accordance with the first compensation signal when the first compensation signal reaches the predetermined current limiting threshold;

obtaining control signals corresponding to each phase power conversion circuit in accordance with the current reference signal for controlling the each phase power conversion circuits to supply power to a load, wherein the first compensation signal represents a difference information between an output feedback signal of the switching power supply and a predetermined reference voltage, and the first voltage signal represents an average current information of the each phase power conversion circuit of the N-phase power conversion circuits.

Optionally, when the first compensation signal reaches the predetermined current limiting threshold, the current reference signal is the first compensation signal, or the current reference signal is a sum of the integration signal and the first compensation signal.

The present disclosure includes at least the following beneficial effects.

According to an embodiment of the present disclosure, a current reference signal is obtained for each phase power conversion circuits by integrating an error between a first compensation signal, which represents a difference information between an output voltage of the switching power supply and a predetermined reference voltage signal, and a first voltage signal, which represents an average current information of each phase power conversion circuit. And the N-phase power conversion circuits are controlled by adding an integration signal and the first compensation signal. In this process, due to the characteristics of an integrator at a steady-state (with an input of zero) and characteristics of response at a fast dynamics (with a slow response speed), the accuracy of the output current of the switching power supply can be improved, and it is benefit to realize the fast current limit of the output current of the switching power supply.

On the other hand, according to an embodiment of the present disclosure, the control method determines whether each phase power conversion circuit reaches a predetermined current limiting threshold, when the threshold has not been reached, the aforementioned integration signal is used as a basic value for obtaining the current reference signal for each phase power conversion circuit. When the threshold has been reached, the current reference signal is obtained according to the first compensation signal. Thus, each phase power conversion circuit can provide a high-precision output current of the switching power supply in accordance with the integration signal when the predetermined current limiting threshold is not reached, and achieve a fast current limiting protection by introducing a rapid change of the first compensation signal into the current reference signal when the threshold is reached. This achieves a good balance between the high-precision output current and the fast current limiting protection.

It should be noted that the general description above and the detailed description below are exemplary and explanatory only and are not intended to limit the invention.

DESCRIPTION OF THE EMBODIMENTS

Figure 1:
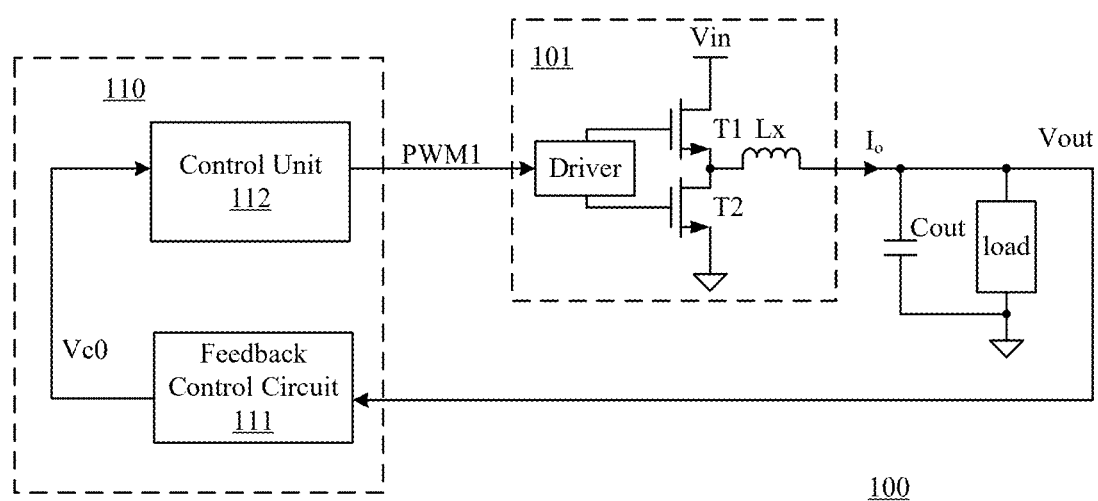
FIG. 1 shows a schematic circuit diagram of a conventional switching power supply.

For ease of understanding the present disclosure. A more complete description of the present disclosure will be given below with reference to the associated drawings. Preferred embodiments of the present disclosure are given in the drawings. However the present disclosure may be implemented in different forms and is not limited to the embodiments described herein. Rather these embodiments are provided to enable a more thorough and comprehensive understanding of the disclosure of the present disclosure.

It should be noted that, in this context. A switching device is a transistor operating in a switching mode to provide a current path, including one selected from the group consisting of bipolar transistors or field effect transistors. A first terminal and a second terminal of the switching device are respectively a high potential terminal and a low potential terminal on the current path, and a control terminal of the switching device is used for receiving a driving signal for turning on or off the transistor. In addition, in this disclosure, the description of turning on or off the power conversion circuit corresponds to turning on or off a main switching device which receives an input voltage in the power conversion circuit. For example, turning on the power conversion circuit means turning on the main switching device in the power conversion circuit to connect an energy storage element in the circuit to an input for charging and storing energy, and supplying power to a load (i.e. generating an output voltage corresponding to an input voltage). Turning off the power conversion circuit means turning off the main switching device in the power conversion circuit to stop charging the energy storage element in the circuit and stop supplying power output to the load.

FIG. 1 shows a schematic circuit diagram of a conventional switching power supply. As shown in FIG. 1, the switching power supply 100 includes a control circuit 110, a power conversion circuit 101 and a feedback control circuit 111. The power conversion circuit 101 includes a driver, switching devices T1 and T2 connected between an input voltage Vin and a reference ground, and an inductor Lx, A first terminal of the inductor Lx is connected to an intermediate node of the switching devices T1 and T2, and a second terminal of the inductor Lx is connected to a first terminal of an output capacitor Cout. A second terminal of the output capacitor Cout is connected to ground. A driver in the power conversion circuit 101 receives a pulse width modulation signal PWM1, which is a control signal supplied from the controller 110, for turning on or off a corresponding switching device according to the control signal, and charging an energy storage element for a corresponding period of time to generate an output voltage Vout, and drives a load by means of the output capacitance Cout. The control circuit 110 includes a control unit 112, which provides a first compensation signal Vc0 from the feedback control circuit 111 as a current reference signal, and then turns on or off the switching devices T1 and T2 in accordance with a comparison result of an inductance current and the current reference signal Vc0.

In the switching power supply shown in FIG. 1, a conventional control method is difficult to achieve a high accuracy of an output current Io of the switching power supply, and the current limiting effect is relatively poor when performing the fast over-current protection in the switching power supply 100.

In view of the above problems, the present disclosure has improved the control circuit of switching power supply, and provides a fast and direct control method to limit an average current, which obtains an integration signal by integrating an error between a first compensation signal representing a current reference of the power conversion circuit and a first voltage signal representing an average current of the power conversion circuit, and controls each phase power conversion circuit by selecting and processing the integration signal and the first compensation signal. In this way, when each phase power conversion circuit needs current limiting function, a fast change of the first compensation signal can be introduced to the current reference signal of the corresponding phase power conversion circuit to realize the fast current limiting. A high-precision output current is realized when each phase e power conversion circuit does not need current limiting function, which is beneficial to achieve a balance between the high-precision output current and the fast current limiting protection.

The switching power supply according to an embodiment of the present disclosure includes a control circuit of the switching power supply (abbreviated as a control circuit in this disclosure) and N-phase power conversion circuits, where N is a positive integer greater than or equal to 1. The control circuit is used for controlling conduction sequence and charging time of the N-phase power conversion circuits to output together an output voltage Vout. The control circuit is respectively coupled to the N-phase power conversion circuits, and further includes a current reference signal generating means and a control means. The current reference signal generating means is configured to integrate an error between the first compensation signal and the first voltage signal to obtain an integration signal, and to obtain a current reference signal by adding the integration signal and the first compensation signal. The control means is configured to obtain a control signal corresponding to each phase power conversion circuit in accordance with the current reference signal, for controlling the each phase power conversion circuit to supply power to a load. The first voltage signal represents an average value of an output current information of each phase power conversion circuit of the N-phase power conversion circuits.

Embodiment 1

Figure 2:
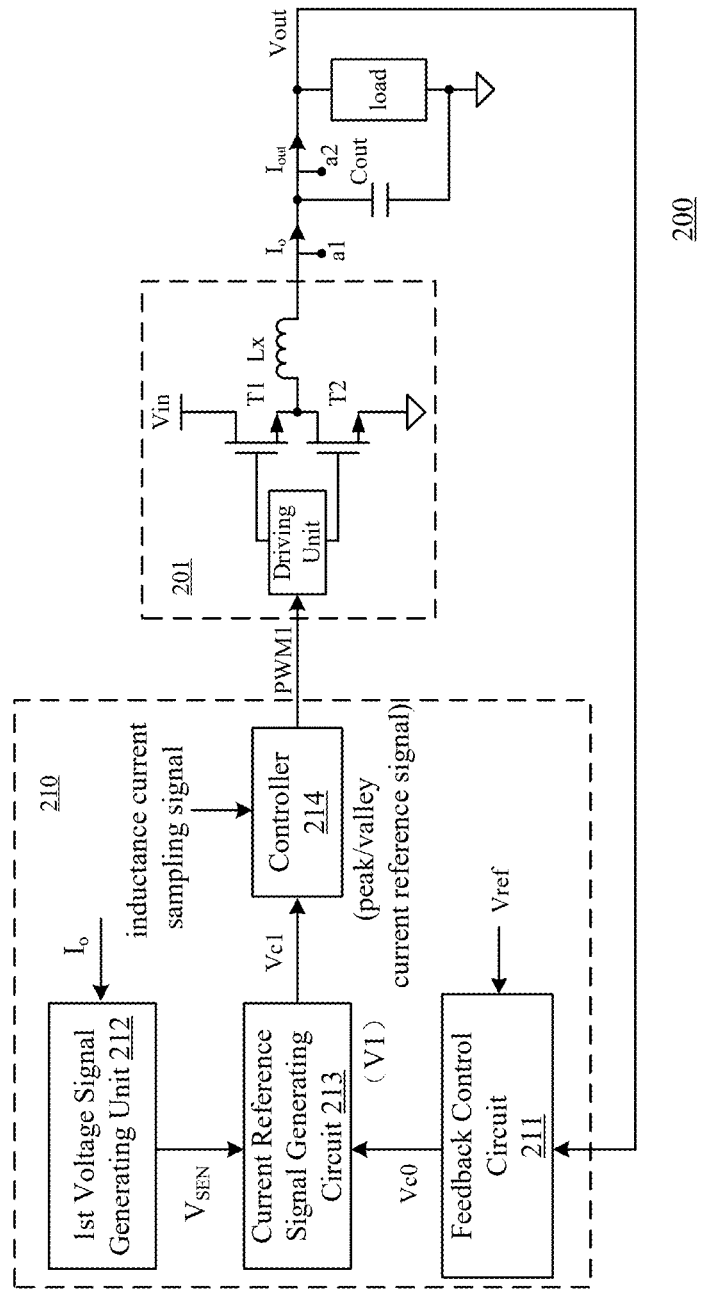
FIG. 2 shows a schematic circuit diagram of a switching power supply according to a first embodiment of the present disclosure.

In this embodiment, N is equal to 1. As shown in FIG. 2, the switching power supply 200 disclosed in this embodiment includes a power conversion circuit 201 and a control circuit 210. The power conversion circuit 201 has an input terminal coupled to an input voltage and an output terminal coupled to a load for providing a power output.

It should be noted that although the power conversion circuit 201 shown in FIG. 2 can be understood with reference to the power conversion circuit 101 in FIG. 1, and although the power conversion circuit 201 is described as having a Buck topology layout (Buck), the present disclosure can be applied in any type of topography, such as Boost, Flyback, Buck-Boost, Cuk, Sepic, Zeta, and the like.

A control circuit 210 is coupled to the power conversion circuit 201, and the control circuit 210 generates a current reference signal Vc1 based on an error integration result of a first compensation signal Vc0 and a first voltage signal ($V_{SEN}$), and obtains a control signal PWM1 of the power conversion circuit 201 in accordance with the current reference signal Vc1 to control the power conversion circuit 201 to supply power to a load. The first voltage signal $V_{SEN}$ represents an average value of the output current of the power conversion circuit 201, and can be obtained by sampling an output current Iout of the switching power supply 200, or obtained by sampling an output current Io of the power conversion circuit 201, and taking an average value.

In this embodiment, the control circuit 210 further includes a feedback control circuit 211, a first voltage signal generating unit 212, a current reference signal generating means 213 and a control means 214.

A first input terminal of the feedback control circuit 211 is connected with an output terminal of the power conversion circuit 201, to receive a second sampling signal (FB) representing an output voltage Vout of the switching power supply 200. A second input terminal of the feedback control circuit 211 receives a predetermined reference voltage signal (Vref). An output terminal of the feedback control circuit 211 is connected to the current reference signal generating means 213 to output a first compensation signal Vc0 to the current reference signal generating means 213. The first compensation signal Vc0 represents a difference between the second sampling signal FB and the predetermined reference voltage signal Vref. For example, the second sampling signal FB may be obtained by dividing the output voltage Vout of the switching power supply 200, for example, by a voltage divider sampling circuit consisting of resistors. Moreover, in some embodiments of the present disclosure, the feedback control circuit 211 specifically includes an error amplification circuit which has a first input terminal receiving a reference voltage signal Vref and a second input terminal receiving a second sampling signal FB, and a compensation circuit, an output terminal of the error amplification circuit connected to the compensation circuit and outputs a first compensation signal Vc0.

Optionally, the first voltage signal generating unit 212 is configured to obtain a first voltage signal $V_{SEN}$ by sampling the output current Iout of the switching power supply 200 for example at the node a2. Or, for example, the output current Io of the power conversion circuit 201 is sampled at the node a1 and then averaged to obtain the first voltage signal $V_{SEN}$.

Optionally, in some embodiments of the present disclosure, the current reference signal generating means 213 is configured to integrate an error between the first compensation signal Vc0 and the first voltage signal $V_{SEN}$ to obtain an integration signal ΔVc, and add the integration signal ΔVc and the first compensation signal Vc0 to obtain a current reference signal Vc1; the current reference signal Vc1 can be obtained by directly adding the integration signal ΔVc and the first compensation signal Vc0. Alternatively, the current reference signal Vc1 can be obtained by firstly adding the integration signal ΔVc and the first compensation signal Vc0, and then secondly adding the firstly adding result and a predetermined third compensation signal.

Figure 5:
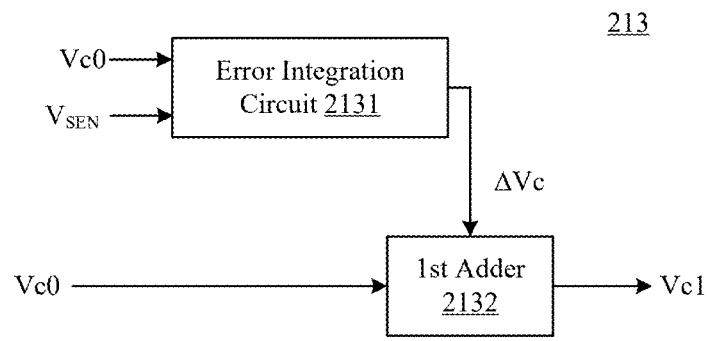
FIG. 5 shows a schematic circuit diagram of a current reference signal generating means/unit according to an embodiment of the present disclosure.

For example, as shown in FIG. 5, a current reference signal generating means 213 according to the present disclosure specifically includes an error integration circuit 2131 and a first adder 2132. The error integration circuit 2131 is configured to integrate a difference between the first compensation signal Vc0 and the first voltage signal $V_{SEN}$ and to output an integration signal ΔVc. The first adder 2132 is configured to add the first compensation signal Vc0 and the integration signal ΔVc to generate a current reference signal Vc1. For example, the error integration circuit 2131 may be a combination of a subtractor and an integrator.

In this embodiment, in view of an operating principle of the integrator, during a fast dynamic change of the switching power supply 200, the integration signal ΔVc of the integrator is approximately unchanged at this time due to a slow response. Furthermore, when an output current of the power conversion circuit suddenly increases, the output voltage will become smaller, so that the first compensation signal Vc0 increases rapidly. At this time, if the first compensation signal Vc0 suddenly changes to the current limiting value, the first adder 2132 can quickly introduce a rapid variation of the first compensation signal Vc0 to the current reference signal Vc1. The current reference signal Vc1 can also change quickly to the corresponding current limiting value, thereby triggering a fast current limiting of the power conversion circuit 201. Finally, the output current Iout of the switching power supply 200 can be quickly limited to a current value corresponding to the current limiting value, thus limiting the output current Iout of the switching power supply quickly. Meanwhile, in a steady state, an input to the integrator is zero. Therefore, when the switching power supply 200 reaches a stable state, Vc0 is equal to $V_{SEN}$ for the power conversion circuit 201. That is, the first compensation signal Vc0 of the power conversion circuit 201 corresponds to its average output current Io. Therefore. A high-precision control or current limiting of the output current Io of the switching power supply 200 can be realized by controlling a value of the first compensation signal Vc0 (i.e., controlling a value of the reference voltage signal Vref).

In other embodiments of the present disclosure, the current reference signal generating means 213 is configured to integrate an error between the first compensation signal Vc0 and the first voltage signal $V_{SEN}$ to obtain an integration signal ΔVc. When the first compensation signal Vc0 reaches a predetermined current limiting threshold value (V1), a current reference signal Vc1 is obtained in accordance with the first compensation signal Vc0 to introduce a rapid change of the first compensation signal Vc0 into the current reference signal Vc1, thereby realizing a rapid current limiting. When the first compensation signal Vc0 does not reach the predetermined current limiting threshold V1, the current reference signal Vc1 is obtained from the integration signal ΔVc, for example, the integration signal ΔVc is added to the predetermined second compensation signal to obtain the current reference signal Vc1. Optionally, when the first compensation signal Vc0 does not reach the predetermined current limiting threshold V1, the current reference signal generating means 213 may provide, for example, the first compensation signal Vc0 as the current reference signal Vc1, or may add the integration signal ΔVc to the first compensation signal Vc0 to obtain the current reference signal Vc1.

Figure 6:
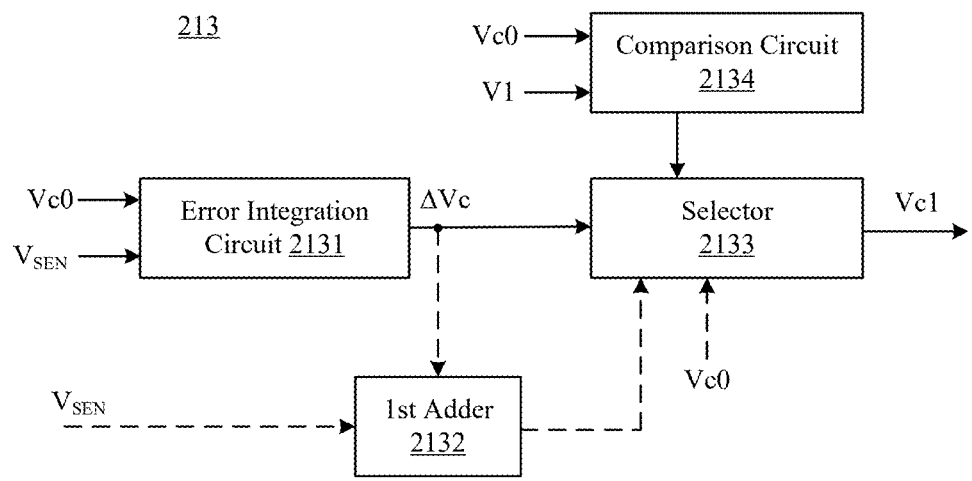
FIG. 6 shows a schematic circuit diagram of another current reference signal generating module/unit according to an embodiment of the present disclosure.

As shown in FIG. 6, another current reference signal generating means 213 according to the present disclosure specifically includes an error integration circuit 2131, a first adder 2132, a comparison circuit 2134, and a selector 2133. Among these, the error integration circuit 2131 and the first adder 2132 can be understood with reference to the description of FIG. 5. The comparison circuit 2134 is configured to compare the first compensation signal Vc0 with the predetermined current limiting threshold V1, and to output a corresponding selection signal in accordance with the comparison result. A first input of the selector 2133 receives the integration signal ΔVC. A second input of the selector 2133 receives an output signal of the first adder 2132 or the first compensation signal Vc0 (the first adder 2132 may be omitted when the second input of the selector 2133 receives the first compensation signal Vc0). A control terminal of the selector 2133 receives the selection signal, and the selector 2133 is configured to select and output a signal received at the first input or a signal received at the second input according to the selection signal.

In this embodiment, it is determined whether the power conversion circuit 201 reaches a predetermined current limiting threshold, then, the integration signal is used as a basic value for obtaining the current reference signal of the each phase power conversion circuit when the predetermined current limiting threshold is not reached, so that the each phase power conversion circuit can provide a high-precision output current of the switching power supply according to the integration signal when the predetermined current limiting threshold is not reached. The current reference signal is obtained in accordance with the first compensation signal when the predetermined current limiting threshold is reached, and a fast change of the first compensation signal can be quickly introduced into the current reference signal to realize the fast current limiting protection, so that the balance between a high-precision output current and the fast current limiting protection is well realized.

Referring again to FIG. 2, in this embodiment, the control means 214 is configured to generate a peak current reference signal and/or a valley current reference signal that controls the peak and/or valley of the inductance current of the power conversion circuit 201 in accordance with the current reference signal Vc1 which is generated by the current reference signal generating means 213. The control signal PWM1 is obtained in accordance with the peak current reference signal and/or the valley current reference signal and with the inductance current sampling signal of the power conversion circuit 201, so as to trigger the turning on or off control of the switching devices (including the switching devices T1 and T2) in the power conversion circuit 201, and further control the power conversion circuit 201 to supply power to the load.

Embodiment 2

Figure 3:
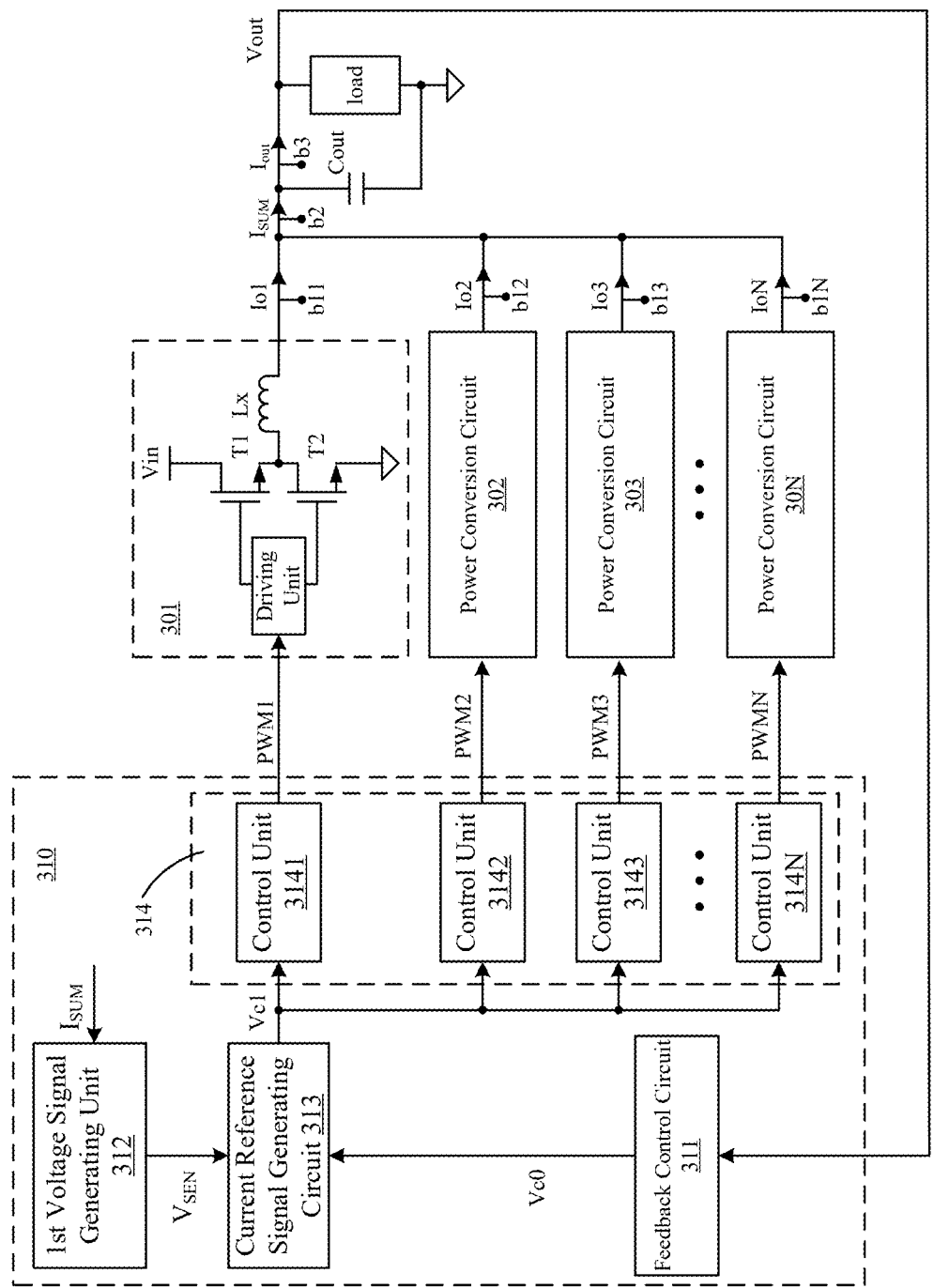
FIG. 3 shows a schematic circuit diagram of a switching power supply according to a second embodiment of the present disclosure.

In this embodiment, N is greater than 1. As shown in FIG. 3, the switching power supply 300 disclosed in this embodiment includes a control circuit 310 of the switching power supply and N-phase power conversion circuits 301-30N which are connected in parallel.

Each of the N-phase power conversion circuits 301-30N can be understood with reference to the description of the power conversion circuit 201 in the above first embodiment and will not be described here.

In this embodiment, a control circuit 310 is coupled to the N-phase power conversion circuits 301-30N. The control circuit 310 is used for generating a current reference signal Vc1 according to an error integration result of the first compensation signal Vc0 and the first voltage signal $V_{SEN}$, and generating control signals PWM1-PWMN respectively for the N-phase power conversion circuits 201-20N in accordance with the current reference signal Vc1, so as for controlling the each phase power conversion circuit to supply power to a load. The first voltage signal $V_{SEN}$ represents an average current of the each phase conversion circuit of the N-phase power conversion circuits 301-30N. The first voltage signal $V_{SEN}$ can be obtained by sampling an output current of the switching power supply 300 and dividing it by N; or, the first voltage signal $V_{SEN}$ can be obtained by sampling a total output current $I_{SUM}$ from the N-phase power conversion circuits 301-30N which are connected in parallel and taking an average, and dividing it by N; or, the first voltage signal $V_{SEN}$ can be obtained by sampling the output current of each phase power conversion circuit of the N-phase power conversion circuits 301-30N and then taking a sum and taking an average and dividing it by N.

In this embodiment, the control circuit 310 further includes a feedback control circuit 311, a first voltage signal generating unit 312, a current reference signal generating means 313 and a control means 314.

The function and configuration of the feedback control circuit 311 can be understood with reference to the description of the feedback control circuit 211 in the first embodiment and will not be described here.

Figure 7A:
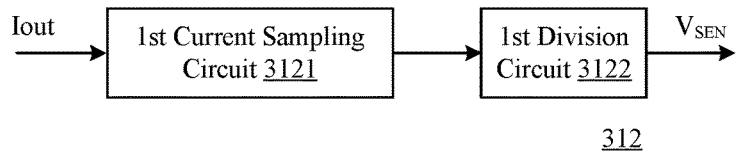
FIGS. 7a to 7c respectively show different schematic circuit diagrams of the first voltage signal generating units in FIG. 3.

Optionally, the first voltage signal generating unit 312 in this embodiment can be configured to sample the output current Iout of the switching power supply 300 to obtain a first sampling signal, and divide the first sampling signal by N to generate a first voltage signal $V_{SEN}$. For example, as shown in FIG. 7a, the first voltage signal generating unit 312 further includes a first current sampling circuit 3121 and a first division circuit 3122. The first current sampling circuit 3121 is configured to sample the output current Iout of the switching power supply 300 at the node b3 by means of a sampling resistor to obtain a first sampling signal. The first division circuit 3122 is configured to divide the first sample signal by N to output a first voltage signal $V_{SEN}$. It can be understood that the first voltage signal $V_{SEN}$ obtained from the first sampling signal in this embodiment can be realized not only by a dividing circuit, but also by a voltage dividing circuit, as long as the value of the finally result of the first voltage signal $V_{SEN}$ is equal to 1-Nth of the first sampling signal.

Figure 7B:
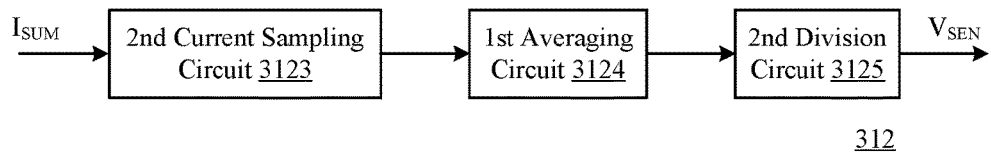

Optionally, the first voltage signal generating unit 312 in this embodiment can also be configured to sample the total output current $I_{SUM}$ from the N-phase power conversion circuits which are connected in parallel and taking an average, and generate the first voltage signal $V_{SEN}$ after dividing it by N. For example, as shown in FIG. 7b, the first voltage signal generating unit 312 further includes a second current sampling circuit 3123, a first averaging circuit 3124 and a second dividing circuit 3125. The second current sampling circuit 3123 is configured to sample a total output current $I_{SUM}$ from the N-phase power conversion circuits which are connected in parallel at the node b2 by means of a sampling resistor. The first averaging circuit 3124 is configured to average the sampling signal output from the second current sampling circuit 3123, and the second dividing circuit 3125 is configured to divide the output signal of the first averaging circuit 3124 to output the first voltage signal $V_{SEN}$.

Figure 7C:
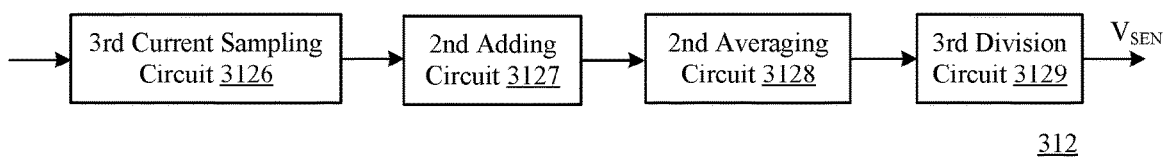

Optionally, the first voltage signal generating unit 312 in this embodiment can also be configured to generate the first voltage signal $V_{SEN}$ after sampling the output current of each phase power conversion circuit of the N-phase power conversion circuits and then performing summing, averaging, and dividing it by N. As shown in FIG. 7c, the first voltage signal generating unit 312 further includes a plurality of third current sampling circuits 3126, a second adder 3317, a second averaging circuit 3128 and a third division circuit 3129. The plurality of third current sampling circuits 3126 are configured to sample output currents Io1 to IoN of the N-phase power conversion circuits at the nodes b11 to b1N respectively by means of sampling resistors. The second adding circuit 3127 is configured to perform summing on a plurality of sampling signals of the plurality of third current sampling circuits 3126. The second averaging circuit 3128 is configured to average an output signal of the second adder 3127, and the third dividing circuit 3129 is configured to divide an output signal of the second averaging circuit 3128 to output the first voltage signal $V_{SEN}$. It can be understood that the first voltage signal generating unit 312 generates the first voltage signal $V_{SEN}$ by performing sampling, summing, averaging, and dividing by N on the output currents of the each phase power converting circuit of the N-phase power converting circuits to obtain the first voltage signal $V_{SEN}$, in addition to the processing sequence described above, alternatively, the first voltage signal $V_{SEN}$ can be obtained by the processing sequence of summing, dividing by N and averaging; or the output current of the each phase power conversion circuit can be sampled and averaged separately, and then the averaged output currents of the each phase power conversion circuit are summed and divided by N to generate the first voltage signal $V_{SEN}$, which is not limited by the present disclosure. In a specific implementation, only some changes are required for connections among the plurality of third current sampling circuits 3126, the second adder 3317, the second averaging circuit 3128, and the third division circuit 3129 in FIG. 7c.

In this embodiment, the function and configuration of the current reference signal generating means 313 can be understood by referring to the description of the current reference signal generating means 213 in the first embodiment and will not be described here.

Referring again to FIG. 3, the control means 314 includes N-phase control units 3141-314N. The N-phase control units 3141-314N correspond one-to-one with the N-phase power conversion circuits 301-30N. The control means 314 is configured to provide control signals PWM1-PWMN corresponding to the each phase power conversion circuit in accordance with the current reference signal Vc1, which is generated by the current reference signal generating means 313, to control the each -phase power conversion circuit to supply power to a load.

In this embodiment, the current reference signal Vc1 can be converted into a peak current reference signal and/or a valley current reference signal for controlling the peak value and/or the valley value of the inductance current of the corresponding phase power conversion circuit after being processed.

Optionally, in some embodiments of the present disclosure, the processing of the current reference signal Vc1 is performed separately by each phase control unit. That is, each phase control unit of the N-phase control units 3141-314N is configured to generate a peak current reference signal and/or a valley current reference signal of the corresponding phase power conversion circuit in accordance with the current reference signal Vc1, and to obtain a control signal in accordance with the peak current reference signal and/or the valley current reference signal of the corresponding phase power conversion circuit and an inductance current sampling signal of the corresponding phase power conversion circuit, for triggering the turning on or off control of the switching devices in the corresponding phase power conversion circuit. With the M-th phase control unit 314M of the N-phase control units 3141-314N as an example, the M-th phase control unit 314M can be configured to generate an M-th peak current reference signal and/or an M-th valley current reference signal in accordance with the current reference signal Vc1. The M-th control signal is obtained in accordance with the M-th peak current reference signal and/or the M-th valley current reference signal and the M-th inductance current sampling signal, for triggering the turning on or off control of the switching devices in the M-th phase power conversion circuit. Here, M may be any integer from 1 to N. The M-th inductance current sampling signal represents the inductance current value of the M-th phase power conversion circuit 20M. In this way, it is beneficial to realize an accurate control for each phase power conversion circuit. In addition, in view of the configuration and the operating principle of the control means 314, it is beneficial to realize a current sharing control of the N-phase power conversion circuits 301 to 30N in the switching power supply 300.

In other embodiments of the present disclosure, the control means 314 further includes a current reference signal processing means. The processing of the current reference signal Vc1 is uniformly performed by the current reference signal processing means. That is, the current reference signal processing means can generate a peak current reference signal and/or a valley current reference signal in accordance with the current reference signal Vc1. Each phase control unit of the N-phase control units 3141-314N is configured to obtain a control signal for triggering the turning on or off control of the switching device in the corresponding phase power conversion circuit in accordance with the peak current reference signal and/or the valley current reference signal which is generated by the current reference signal processing means and the inductance current sampling signal of the corresponding phase power conversion circuit. With the M-th phase control unit 214M of the N-phase control units 3141-314N as an example, the M-th phase control unit 314M can be configured to obtain an M-th control signal in accordance with the peak current reference signal and/or the valley current reference signal which is generated by the current reference signal processing means and an M-th inductance current sampling signal, for triggering the turning on or off control of the switching devices in the M-th phase power conversion circuit 20M. Here M is any integer from 1 to N. The M-th inductance current sampling signal represents the inductance current of the M-th phase power conversion circuit.

In this embodiment, because the current reference signal Vc1 output from the current reference signal generating means 313 is simultaneously outputted to each of the control units, only one current reference signal generating means 313 is needed in the present disclosure to realize the current reference signals of all phase power conversion circuits to be self-adaptive adjustment, and the circuit structure is simple.

Further, the switching power supply 300 also includes a plurality of driving units. The plurality of driving units are configured to generate driving signals in accordance with the control signals PWM1-PWMN which are generated by N-phase control units 3141-314N in the control circuit 310, and to provide the driving signals to control terminals of the switching devices in the corresponding phase power conversion circuit. For example, the plurality of drive units are respectively integrated in each phase power conversion circuit, or, the plurality of drive units are integrated in the control circuit 310 and each drive unit corresponds to a control unit respectively.

Embodiment 3

Figure 4:
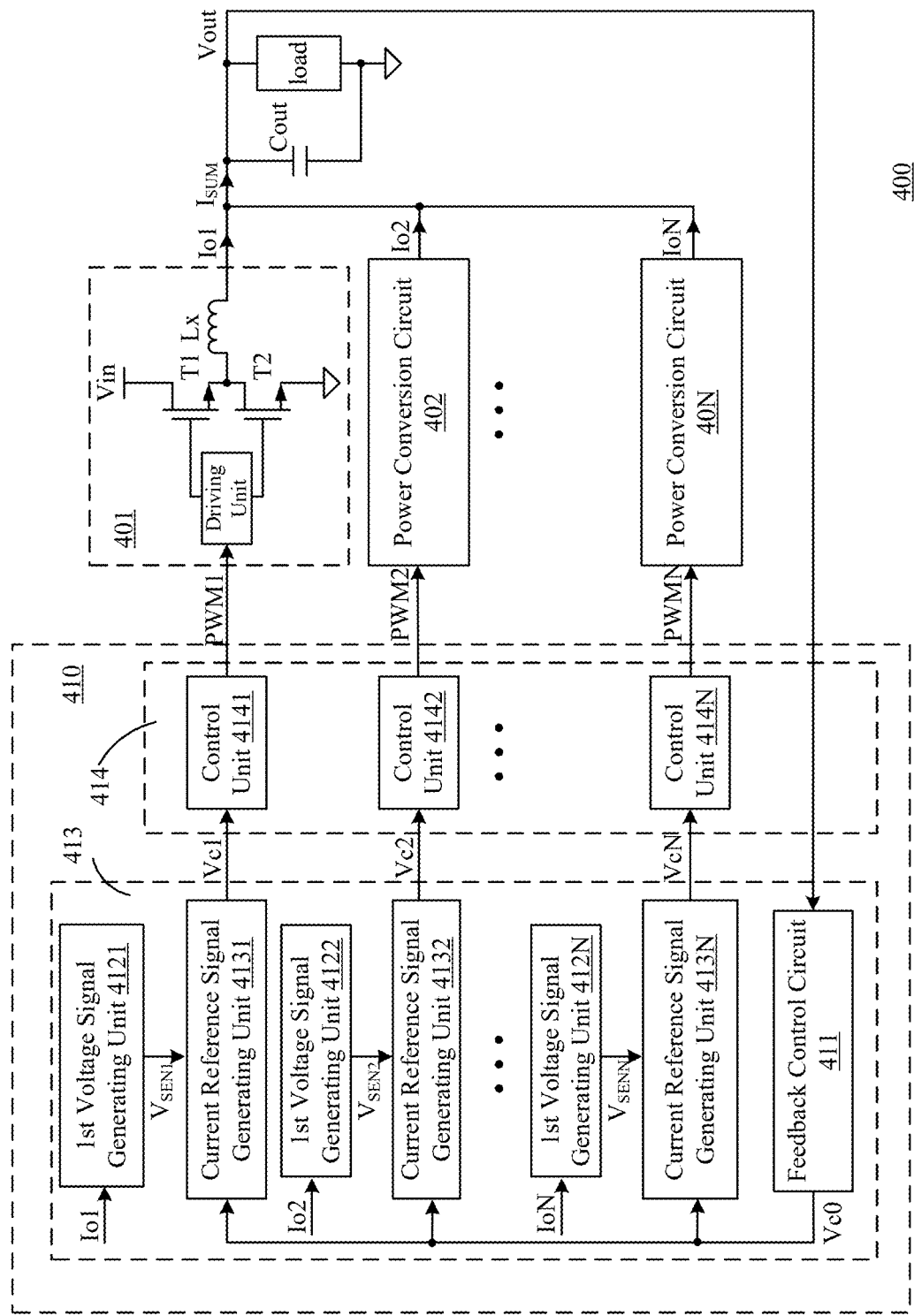
FIG. 4 shows a schematic circuit diagram of a switching power supply according to a third embodiment of the present disclosure.

In this embodiment, N is greater than 1. As shown in FIG. 4, the switching power supply 400 disclosed in this embodiment includes a control circuit 410 of the switching power supply and N-phase power conversion circuits 401-40N which are connected in parallel.

Each phase power conversion circuit of the N-phase power conversion circuits 401-40N can be understood with reference to the description of the power conversion circuit 201 in the first embodiment and will not be described here.

In this embodiment, the control circuit 410 is coupled to the N-phase power conversion circuits 401-40N separately. The control circuit 410 is used for generating current reference signals Vc1 to VcN of the corresponding phase power conversion circuits respectively according to error integration results of the first voltage signals $V_{SEN1}$ to $V_{SENN}$ of the corresponding phase power conversion circuits and the first compensation signal Vc0, and according to this, generating the control signals PWM1-PWMN of the corresponding phase power conversion circuits 401-40N respectively for controlling the each phase power conversion circuits to supply power to the load. The first voltage signal for each phase power conversion circuit represents an average value of the output current of the corresponding phase power conversion circuit, which, for example, can be obtained by sampling the output current of the corresponding phase power conversion circuit, and taking an average value.

In this embodiment, the control circuit 410 further includes a feedback control circuit 411, a current reference signal generating means 413 and a control means 414.

The function and configuration of the feedback control circuit 411 can be understood with reference to the description of the feedback control circuit 211 in the first embodiment and will not be described here.

In this embodiment, the current reference signal generating means 413 further includes N-phase first voltage signal generating units 4121 to 412N and N-phase current reference signal generating units 4131 to 413N.

The N-phase first voltage signal generating units 4121 to 412N correspond to the N-phase power conversion circuits 401 to 40N one by one. Each phase first voltage signal generating unit of the N-phase first voltage signal generating units 4121 to 412N is configured to generate a first voltage signal for the corresponding phase power conversion circuit.

Figure 8:
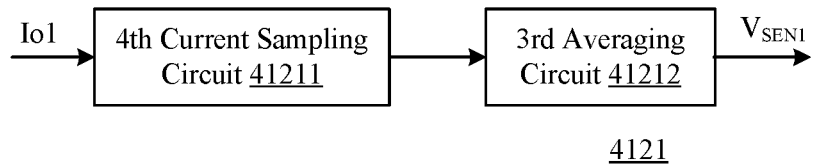
FIG. 8 shows a schematic circuit diagram of a first voltage signal generating unit in FIG. 4.

With the first phase first voltage signal generating unit 4121 as an example, as shown in FIG. 8, the first voltage signal generating unit 4121 of the first phase power conversion circuit 401 further includes a fourth current sampling circuit 41211 and a third averaging circuit 41212. The fourth current sampling circuit 41211 is configured to sample an output current Io1 of the first phase power conversion circuit 401 by means of a sampling resistor. The third averaging circuit 41212 is configured to average the sampling signal obtained by the fourth current sampling circuit 41211 to output a first voltage signal $V_{SEN1}$ for the first phase power conversion circuit 401. Alternatively, the third averaging circuit 41212 can be implemented for example by an RC filter circuit.

The N-phase current reference signal generating units 4131 to 413N correspond to the N-phase power conversion circuits 401 to 40N and the N-phase first voltage signal generating units 4121 to 412N one by one. Each phase current reference signal generating unit of the N-phase current reference signal generating units 4131 to 413N is configured to integrate an error between the first compensation signal Vc0 and the first voltage signal of the corresponding phase power conversion circuit to obtain an integration signal of the corresponding phase power conversion circuit. The integration signal of the corresponding phase power conversion circuit is added to the first compensation signal Vc0 to obtain a current reference signal of the corresponding phase power conversion circuit. With the M-th phase current reference signal generating unit 413M in the N-phase current reference signal generating units 4131 to 413N as an example, the M-th phase current reference signal generating unit 413M can be configured to integrate an error between the first compensation signal Vc0 and the first voltage signal $V_{SENM}$ for the M-th phase power conversion circuit to obtain an integration signal ΔVcM for the M-th phase power conversion circuit 40M. The integration signal ΔVcM for the M-th phase power conversion circuit 40M is added to the first compensation signal Vc0 to obtain a current reference signal VcM for the M-th phase power conversion circuit 40M. Here M is any integer from 1 to N.

Further, the circuit configuration of each phase current reference signal generating unit of the N-phase current reference signal generating units 4131 to 413N can be understood with reference to the description of the current reference signal generating means 213 in the above first embodiment, and will not be described here.

Referring again to FIG. 4, a control means 414 includes N-phase control units 4141-414N which correspond one-to-one with the N-phase power conversion circuits 401-40N. Each phase control unit of the N-phase control units 4141-414N is configured to generate a control signal for the corresponding phase power conversion circuit in accordance with a current reference signal of the corresponding phase power conversion circuit to control the each phase power conversion circuit to supply power to a load.

In this embodiment, the function and circuit configuration of each of the N-phase control units 4141-414N can be understood with reference to the description of the control means 214 in the above first embodiment and will not be described here.

Further, the switching power supply 400 also includes a plurality of driving units. The plurality of driving units are configured to generate driving signals in accordance with the control signals PWM1-PWMN which are generated by N-phase control units 4141-414N in the control circuit 410, and to provide the driving signals to control terminals of switching devices in the corresponding phase power conversion circuits. For example, the plurality of drive units are respectively integrated in each phase power conversion circuit, or, the plurality of drive units are integrated in a control circuit 410 and each of the drive units corresponds to respective one of the control units.

It can be understood that in this embodiment, in view of the operating principle of integrators in the N-phase current reference signal generating units 4131 to 413N, when the switching power supply 400 reaches a steady state, average values of the output currents of all phase power conversion circuits of the switching power supply 400 are all equal. That is, the switching power supply 400 according to this embodiment can realize a current sharing control of the N-phase power conversion circuits 401 to 40N of the switching power supply 400, in addition to the beneficial effects shown in the first embodiment.

Figure 9:
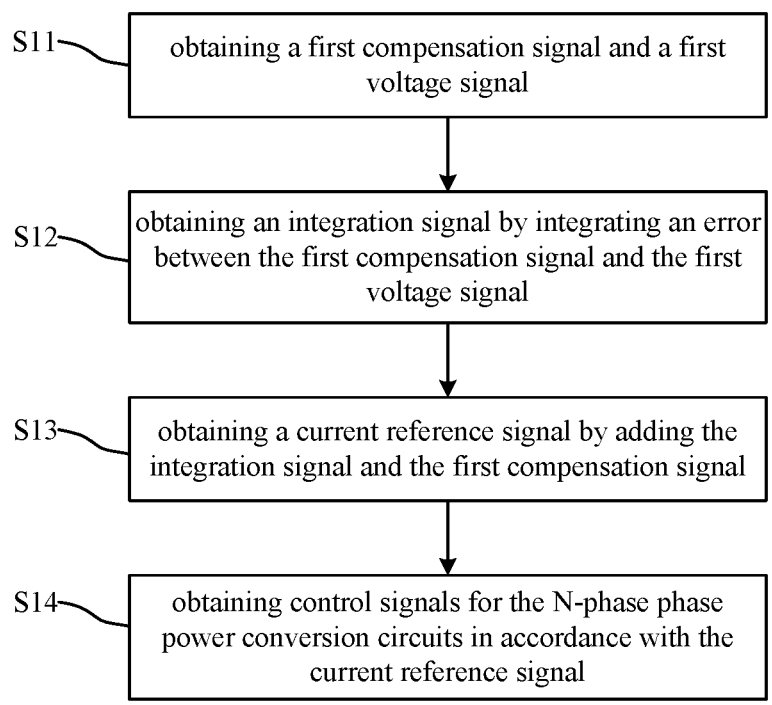
FIG. 9 shows a flow diagram of a control method of a switching power supply according to a first embodiment of the present disclosure.
Figure 10:
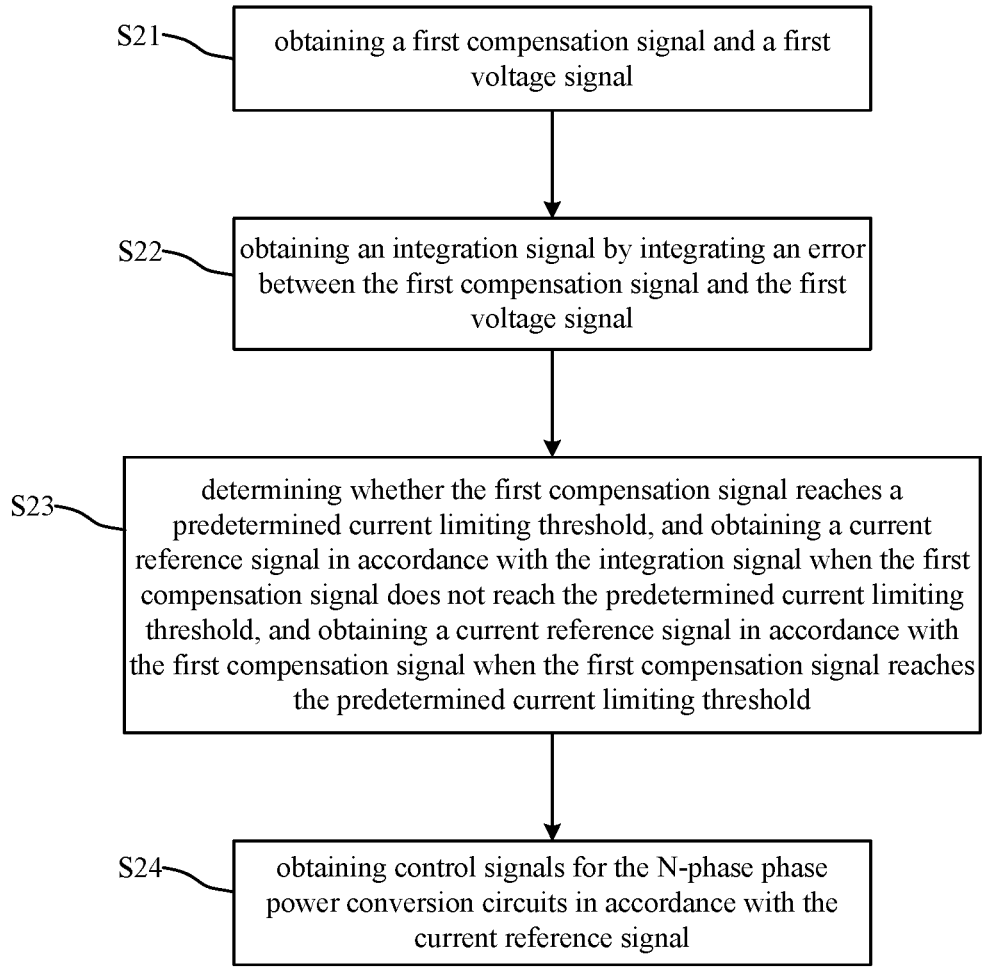
FIG. 10 shows a flow diagram of a control method of a switching power supply according to a second embodiment of the present disclosure.

Further, the present disclosure also includes a control method of a switching power supply, which can be applied to a single-phase switching power supply as shown in the above embodiment 1 (N equals 1), or can be applied to a multi-phase switching power supply as shown in the above embodiment 2 or embodiment 3 (N is greater than 1). The control method includes steps S11 to S14, as shown in FIG. 9, or steps S21 to S24, as shown in FIG. 10.

In step S11 or step S21, a first compensation signal and a first voltage signal are obtained. The first voltage signal represents an average current information of each phase power conversion circuit in the N-phase power conversion circuits.

In the embodiment, the method for obtaining the first compensation signal comprises the following steps: sampling an output voltage of the switching power supply to obtain a second sampling signal; amplifying an error between the second sampling signal and the predetermined reference voltage signal to obtain an amplified error signal. The amplified error signal is compensated to obtain a first compensation signal. The first compensation signal represents a difference between an output feedback signal of the switching power supply and a predetermined reference voltage signal.

Meanwhile, in the first embodiment of the present disclosure, N is equal to 1. The method for obtaining the first voltage signal comprises the following steps: sampling an output current of the switching power supply to obtain the first voltage signal, or, firstly sampling an output current of the power conversion circuit and then averaging the output current to obtain a first voltage signal.

In the second embodiment of the present disclosure, N is greater than 1. The method for obtaining the first voltage signal comprises sampling an output current of the switching power supply and dividing the output current by N to obtain the first voltage signal, or, firstly sampling a total output current of the N-phase power conversion circuits which are connected in parallel and then calculating an average value and then dividing it by N to obtain the first voltage signal, or, firstly sampling the output current of each phase power conversion circuit in the N-phase power conversion circuits, and then summing, averaging and dividing it by N to obtain a first voltage signal.

In the third embodiment of the present disclosure, N is greater than 1. The method for obtaining a first voltage signal comprises: sampling an output current of each phase power conversion circuit to obtain a sampling signal for the corresponding phase power conversion circuit, obtaining a first voltage signal for the corresponding power conversion circuits by averaging the sampling signal of each phase power conversion circuit.

In step S12 or step S22, an error between the first compensation signal and the first voltage signal is integrated to obtain an integration signal.

In step S13, the integration signal and the first compensation signal are added to obtain a current reference signal.

In step S23, whether the first compensation signal reaches a predetermined current limiting threshold is determined. When the first compensation signal does not a predetermined current limiting threshold, a current reference signal is obtained from the integration signal. When the first compensation signal reaches a predetermined current limiting threshold, the current reference signal is obtained in accordance with the first compensation signal, for example, the first compensation signal is provided as the current reference signal, or the integration signal is added to the first compensation signal to obtain the current reference signal.

In step S14 or step S24, control signal for corresponding to each phase power conversion circuit is obtained in accordance with the current reference signal.

The specific implementation of each step in the above-described control method of the switching power supply can be found in the previous embodiments of the switching power supply, and will not be described here.

To sum up, according to the embodiments of the present disclosure, a current reference signal for each phase power conversion circuit is obtained by integrating an error between a first compensation signal, which represents a difference between an output voltage of the switching power supply and the predetermined reference voltage signal, and a first voltage signal, which represents an average value of an output current of each phase power conversion circuit, and the N-phase power conversion circuits are controlled by adding the integration signal and the first compensation signal. In this process, due to the characteristics of an integrator at a steady-state (with an input of zero) and characteristics of response at a fast dynamics (with a slow response speed), the accuracy of the output current of the switching power supply can be improved, and it is benefit to realize the fast current limit of the output current of the switching power supply.

On the other hand, in this embodiment, it is determined whether each phase power conversion circuit reaches a predetermined current limiting threshold. The integration signal is used as a basic value for obtaining a current reference signal of each phase power conversion circuit when the current reference signal has not been reached. A current reference signal is obtained in accordance with the first compensation signal when the current reference signal has been reached. In this way, each phase power conversion circuit can provide a high-precision output current of the switching power supply in accordance with the integration signal when the predetermined current limiting threshold is not reached. When the predetermined current limiting threshold is reached, a fast current limiting protection function can be realized by quickly introducing a rapid change of the first compensation signal into the current reference signal, thus realizing the balance between a high-precision output current and a fast current limiting protection function.

Finally, it should be noted that it is clear that the above embodiments are merely examples for the purpose of clearly illustrating the invention and are not a limitation of the manner of implementation. For a person of ordinary skill in the art, other variations or changes can be made on the basis of the above description. Other variations or changes in different forms can be made based on the above description. It is not necessary or possible to give an exhaustive list of all embodiments. The obvious variations or changes derived therefrom remain within the scope of protection of the present invention.

The invention claimed is:

1. A control circuit of a switching power supply which includes N-phase power conversion circuits, N being an integer greater than or equal to 1, wherein the control circuit comprises:
   a current reference signal generating circuit configured to obtain an integration signal by integrating an error between a first compensation signal and a first voltage signal, and to obtain the current reference signal in accordance with the integration signal when the first compensation signal does not reach a predetermined current limiting threshold, and to obtain the current reference signal in accordance with the first compensation signal when the first compensation signal reaches the predetermined current limiting threshold;

a controller, configured to obtain a control signal corresponding to each phase power conversion circuit in accordance with the current reference signal, for controlling each phase power conversion circuit to supply power to a load, wherein the first compensation signal represents difference information between an output feedback signal of the switching power supply and a predetermined reference voltage, and the first voltage signal represents average current information of each phase power conversion circuit of the N-phase power conversion circuits.

2. The control circuit according to claim 1, wherein the current reference signal generating circuit comprises:
an error integration circuit configured to integrate a difference between the first compensation signal and the first voltage signal and to output the integration signal;
a first adder, configured to add the first compensation signal and the integration signal to generate the current reference signal.

3. The control circuit according to claim 1, wherein N is equal to 1, and the first voltage signal is obtained by sampling an output current of the switching power supply, or by sampling an output current of the power conversion circuit and then taking an average value.

4. The control circuit according to claim 1, wherein N is equal to 1, and the controller is configured to generate a peak current reference signal and/or a valley current reference signal in accordance with the current reference signal, and the control signal is obtained in accordance with the peak current reference signal and/or the valley current reference signal and with an inductance current sampling signal of the power conversion circuit, for triggering the turning on or off control of the switching devices in the power conversion circuit.

5. The control circuit according to claim 1, wherein N is greater than 1, and the first voltage signal is obtained by sampling an output current of the switching power supply and dividing the output current by N; or
by sampling a total output current of the N-phase power conversion circuits which are connected in parallel, averaging the total output current, and dividing by N; or
by sampling output currents of each phase power conversion circuit of the N-phase power conversion circuits, summing the output currents, averaging a sum of the output currents, and dividing by N.

6. The control circuit according to claim 1, wherein N is greater than 1, and
the controller comprises:
N-phase control units, corresponding to N-phase power conversion circuits one by one, each phase control unit of the N-phase control units is configured to generate a peak current reference signal and/or a valley current reference signal for the corresponding phase power conversion circuit in accordance with the current reference signal, and to obtain the control signal in accordance with the peak current reference signal and/or the valley current reference signal of the corresponding phase power conversion circuit and an inductance current sampling signal of the corresponding phase power conversion circuit, for triggering the turning on or off control of the switching devices in the corresponding phase power conversion circuit.

7. The control circuit according to claim 1, wherein N is greater than 1, and
the controller is
configured to generate a peak current reference signal and/or a valley current reference signal in accordance with the current reference signal, and the controller comprises;
N-phase control units, corresponding to N-phase power conversion circuits one by one, each phase control unit of the N-phase control units is configured to obtain the control signal in accordance with the peak current reference signal and/or the valley current reference signal and with an inductance current sampling signal of the corresponding phase power conversion circuit, for triggering the turning on or off control of the switching devices in the corresponding phase power conversion circuit.

8. The control circuit according to claim 1, wherein N is greater than 1, and the current reference signal generating circuit comprises:
N-phase first voltage signal generating units, corresponds to N-phase power conversion circuits one by one, each phase first voltage signal generating unit of the N-phase first voltage signal generating units is configured to generate a first voltage signal for the corresponding phase power conversion circuit;
N-phase current reference signal generating units, corresponds to N-phase power conversion circuits one by one, each phase current reference signal generating unit of the N-phase current reference signal generating units is configured to obtain an integration signal of the corresponding phase power conversion circuit by integrating an error between the first voltage signal of the corresponding phase power conversion circuit and the first compensation signal, and to obtain a current reference signal of the corresponding phase power conversion circuit by adding the integration signal of the corresponding phase power conversion circuit and the first compensation signal;
the controller comprises N-phase control units, corresponding to N-phase power conversion circuits one by one, each phase control unit of the N-phase control units is configured to obtain the control signal of the corresponding phase power conversion circuit in accordance with a current reference signal of the corresponding phase power conversion circuit to control the phase power conversion circuit to supply power to a load,
wherein the first voltage signal of each phase power conversion circuit represents an average value of the output current of the corresponding phase power conversion circuit.

9. The control circuit according to claim 6, wherein each phase current reference signal generating unit of the N-phase current reference signal generating units comprises:
an error integration circuit, configured to integrate a difference between the first compensation signal and the first voltage signal of the corresponding phase power conversion circuit, and to output an integration signal of the corresponding phase power conversion circuit;
a first adder, configured to add the integration signal of the corresponding phase power conversion circuit and the first compensation signal to generate a current reference signal of the corresponding phase power conversion circuit.

10. The control circuit according to claim 1, wherein when the first compensation signal reaches the predetermined current limiting threshold, the current reference signal generating circuit is configured to provide the first compensation signal as the current reference signal, or to provide a sum of the integration signal and the first compensation signal as the current reference signal.

11. The control circuit according to claim 1, is part of a switching power supply.

12. A control method of a switching power supply which includes N-phase power conversion circuits, N being an integer greater than or equal to 1, wherein the control method comprises:
obtaining a first compensation signal and a first voltage signal;
obtaining an integration signal by integrating an error between the first compensation signal and the first voltage signal;
obtaining a current reference signal in accordance with the integration signal when the first compensation signal does not reach a predetermined current limiting threshold, and to obtain a current reference signal in accordance with the first compensation signal when the first compensation signal reaches the predetermined current limiting threshold;
obtaining control signals corresponding to each phase power conversion circuit in accordance with the current reference signal for controlling each phase power conversion circuit to supply power to a load,
wherein the first compensation signal represents a difference information between an output feedback signal of the switching power supply and a predetermined reference voltage, and the first voltage signal represents an average current information of each phase power conversion circuit of the N-phase power conversion circuits.

13. The control method according to claim 12, wherein the step of obtaining the first compensation signal comprises:
obtaining a second sampling signal by sampling an output voltage of the switching power supply and;
obtaining the first compensation signal by compensating an error between the second sampling signal and the predetermined reference voltage.

14. The control method according to claim 12, wherein N is equal to 1, and the step of obtaining the first voltage signal comprises:
sampling an output current of the switching power supply; or
sampling an output current of a power conversion circuit and taking an average value.

15. The control method according to claim 12, wherein N is greater than 1, and the step of obtaining the first voltage signal comprises:
sampling an output current of the switching power supply and dividing the output current by N; or
sampling a total output current of the N-phase power conversion circuits which are connected in parallel, averaging the total output current, and dividing by N; or
sampling output currents of each phase power conversion circuit of the N-phase power conversion circuits, summing the output currents, averaging a sum of the output currents, and dividing the sum of the output currents by N.

16. The control method according to claim 12, wherein N is greater than 1, and the step of obtaining the first voltage signal comprises:
obtaining sampling signals corresponding to each phase power conversion circuit by sampling output currents of each phase power conversion circuit;
obtaining first voltage signals corresponding to each phase power conversion circuit by averaging the sampling signals of each phase power conversion circuit.

* * * * *